(12) United States Patent
Rico Alvarino et al.

(10) Patent No.: US 11,206,661 B2
(45) Date of Patent: Dec. 21, 2021

(54) SUPPORT OF WIDEBAND PHYSICAL RESOURCE GROUP (PRG) IN LONG TERM EVOLUTION (LTE)

(71) Applicant: QUALCOMM Incorporated, San Diego, CA (US)

(72) Inventors: Alberto Rico Alvarino, San Diego, CA (US); Alexandros Manolakos, San Diego, CA (US); Amir Farajidana, Sunnyvale, CA (US); Supratik Bhattacharjee, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 16/671,053

(22) Filed: Oct. 31, 2019

(65) Prior Publication Data

US 2020/0145974 A1   May 7, 2020

(30) Foreign Application Priority Data

Nov. 2, 2018   (GR) .............................. 20180100502

(51) Int. Cl.
 *H04W 72/04* (2009.01)
 *H04L 5/00* (2006.01)

(52) U.S. Cl.
 CPC ......... *H04W 72/044* (2013.01); *H04L 5/0007* (2013.01); *H04L 5/0042* (2013.01); *H04W 72/042* (2013.01)

(58) Field of Classification Search
 CPC ........................ H04W 72/044; H04W 72/042; H04L 5/0042; H04L 5/0007; H04L 5/0048

See application file for complete search history.

(56) References Cited

U.S. PATENT DOCUMENTS

| 2005/0123060 A1* | 6/2005 | Maltsev | .............. H04L 27/2647 375/260 |
| 2009/0196163 A1* | 8/2009 | Du | ........................ H04L 5/0046 370/204 |

(Continued)

FOREIGN PATENT DOCUMENTS

| CN | 105636211 A | 6/2016 |
| CN | 109391394 A | 2/2019 |

(Continued)

OTHER PUBLICATIONS

International Search Report and Written Opinion—PCT/US2019/059536—ISA/EPO—dated Apr. 6, 2020.

(Continued)

*Primary Examiner* — Mohammad S Anwar
(74) *Attorney, Agent, or Firm* — Qualcomm/Norton Rose Fulbright

(57) ABSTRACT

In an aspect, a method of wireless communication includes receiving, by a user equipment (UE), downlink control information (DCI) having a resource allocation of allocated physical resource blocks (PRBs). The method additionally includes employing at least one of a) a wideband decoder, b) a wideband channel estimator, c) a bandwidth-specific decoder, or d) a bandwidth-specific channel estimator for wireless communications based at least on a feature of the resource allocation in the DCI. In other aspects a UE transmits, to a base station, an indication of UE capabilities regarding support of wideband physical resource group (PRG) for various transmission time interval (TTI) durations.

30 Claims, 6 Drawing Sheets

(56) References Cited

U.S. PATENT DOCUMENTS

| | | | |
|---|---|---|---|
| 2011/0255483 A1* | 10/2011 | Xu | H04L 25/0232 |
| | | | 370/329 |
| 2018/0255550 A1* | 9/2018 | Takeda | H04W 72/042 |
| 2019/0116594 A1 | 4/2019 | Kwak et al. | |
| 2019/0215809 A1 | 7/2019 | Yang et al. | |

FOREIGN PATENT DOCUMENTS

| | | |
|---|---|---|
| WO | WO-2018132781 A1 | 7/2018 |
| WO | WO-2018227583 A1 | 12/2018 |

OTHER PUBLICATIONS

Huawei, et al., "Discussion on PRG Size for TM9 and TM10", 3GPP Draft, 3GPP TSG RAN WG1 Meeting #94bis, R1-1810165, 3rd Generation Partnership Project (3GPP), Mobile Competence Centre, 650, Route Des Lucioies, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051517580, 4 Pages, Retrieved from the Internet: URL: http://www.3gpp.org/ftp/tsg%SFran/WG1%5FRL1/TSGR1%5F94b/Docs/R1%2D1810165%2Ezip [retrieved on Sep. 29, 2018], the whole document.

Intel Corporation: "On Muiti-TRP/Multi-Panel Transmission", 3GPP Draft, 3GPP TSG RAN WG1 Meeting #97, R1-1908653, 3rd Generation Partnership Project (3GPP), Mobile Competence Centre, 650, Route Des Lucioies, F-06921 Sophia-Antipolis Cedex, France vol. RAN WG1, No. Prague, CZ, Aug. 26, 2019-Aug. 30, 2019 Aug. 17, 2019 (Aug. 17, 2019), XP051765261, pp. 1-24, Retrieved from the Internet: URL:http://www.3gpp.org/ftp/tsg_ran/WG1_RL1/TSGR1_98/Docs/R1-1908653.zip [retrieved on Aug. 17, 2019] Passage "Alignment of PRG grid"; paragraph [0002].

OPPO: "Text Proposal for DL PRB Bundling", 3GPP Draft, 3GPP TSG RAN WG1 Meeting AH 1801, R1-1800497, 3rd Generation Partnership Project (3GPP), Mobile Competence Centre, 650, Route Des Lucioles, F-06921 Sophia-Antipolis Cedex, France. vol. RAN WG1, No. Vancouver, Canada, Jan. 22, 2018-Jan. 26, 2018, Jan. 12, 2018 (Jan. 12, 2018), XP051384360, 3 Pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 12, 2018], paragraph [0002].

Partial International Search Report—PCT/US2019/059536—ISA/EPO—dated Feb. 13, 2020.

* cited by examiner

SUPPORT OF WIDEBAND PHYSICAL RESOURCE GROUP (PRG) IN LONG TERM EVOLUTION (LTE)

CROSS-REFERENCE TO RELATED APPLICATIONS

This application claims the benefit of Greece Provisional Patent Application No. 20180100502, entitled, "SUPPORT OF WIDEBAND PHYSICAL RESOURCE GROUP (PRG) IN LONG TERM EVOLUTION (LTE)," filed on Nov. 2, 2018, which is expressly incorporated by reference herein in its entirety.

TECHNICAL FIELD

Aspects of the present disclosure relate generally to wireless communication systems, and more particularly, to support of wideband physical resource group (PRG) in long term evolution (LTE).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect, a method of wireless communication includes receiving, by a user equipment (UE), downlink control information (DCI) having a resource allocation of allocated physical resource blocks (PRBs). The method additionally includes employing at least one of a) a wideband decoder, b) a wideband channel estimator, c) a bandwidth-specific decoder, or d) a bandwidth-specific channel estimator for wireless communications based at least on a feature of the resource allocation in the DCI.

In another aspect, a method of wireless communication includes transmitting, by a user equipment (UE) to a base station, an indication of UE capabilities. The UE capabilities may be regarding whether the UE can support wideband physical resource groups (PRGs) in transmission time intervals (TTIs) having durations of one millisecond (1 ms) or more. Alternatively or additionally, the UE capabilities may be regarding whether the UE can support wideband PRGs in short TTIs having durations of less than 1 ms. Alternatively or additionally, the UE capabilities may be regarding whether the UE can support simultaneous wideband PRGs in TTIs having durations of 1 ms or more and wideband PRGs in short TTIs having durations of less than 1 ms. The method additionally includes receiving a configuration, by the UE from the base station, to perform wireless communications in wideband mode for a given TTI.

In another aspect, a method of wireless communication includes receiving, by a base station from a user equipment (UE), an indication of UE capabilities. The UE capabilities may be regarding whether the UE can support wideband physical resource groups (PRGs) in transmission time intervals (TTIs) having durations of one millisecond (1 ms) or more. Alternatively or additionally, the UE capabilities may be regarding whether the UE can support wideband PRGs in short TTIs having durations of less than 1 ms. Alternatively or additionally, the UE capabilities may be regarding whether the UE can support simultaneous wideband PRGs in TTIs having durations of 1 ms or more and wideband PRGs in short TTIs having durations of less than 1 ms. The method additionally includes configuring the UE, by the base station, to perform wireless communications in wideband mode for a given TTI based at least on the indication of UE capabilities.

In another aspect, an apparatus of wireless communication has means for receiving, by a user equipment (UE), downlink control information (DCI) having a resource allocation of allocated physical resource blocks (PRBs). The apparatus additionally has means for employing at least one of a) a wideband decoder, b) a wideband channel estimator, c) a bandwidth-specific decoder, or d) a bandwidth-specific channel estimator for wireless communications based at least on a feature of the resource allocation in the DCI.

In another aspect, an apparatus of wireless communication has means for transmitting, by a user equipment (UE) to a base station, an indication of UE capabilities. The UE capabilities may be regarding whether the UE can support wideband physical resource groups (PRGs) in transmission time intervals (TTIs) having durations of one millisecond (1 ms) or more. Alternatively or additionally, the UE capabilities may be regarding whether the UE can support wideband PRGs in short TTIs having durations of less than 1 ms. Alternatively or additionally, the UE capabilities may be regarding whether the UE can support simultaneous wideband PRGs in TTIs having durations of 1 ms or more and wideband PRGs in short TTIs having durations of less than 1 ms. The apparatus also has means for receiving a configuration, by the UE from the base station, to perform wireless communications in wideband mode for a given TTI.

In another aspect, an apparatus of wireless communication has means for receiving, by a base station from a user equipment (UE), an indication of UE capabilities. The UE capabilities may be regarding whether the UE can support wideband physical resource groups (PRGs) in transmission time intervals (TTIs) having durations of one millisecond (1 ms) more. Alternatively or additionally, the UE capabilities may be regarding whether the UE can support wideband PRGs in short TTIs having durations of less than 1 ms. Alternatively or additionally, the UE capabilities may be regarding whether the UE can support simultaneous wideband PRGs in TTIs having durations of 1 ms or more and wideband PRGs in short TTIs having durations of less than 1 ms. The apparatus additionally has means for configuring the UE, by the base station, to perform wireless communications in wideband mode for a given TTI based at least on the indication of UE capabilities.

In another aspect, a non-transitory computer-readable medium has program code recorded thereon, including program code executable by a computer for causing the computer to receive, by a user equipment (UE), downlink control information (DCI) having a resource allocation of allocated physical resource blocks (PRBs). The program code additionally includes program code executable by the computer for causing the computer to employ at least one of a) a wideband decoder, b) a wideband channel estimator, c) a bandwidth-specific decoder, or d) a bandwidth-specific channel estimator for wireless communications based at least on a feature of the resource allocation in the DCI.

In another aspect, a non-transitory computer-readable medium has program code recorded thereon, including program code executable by the computer for causing the computer to transmit, by a user equipment (UE) to a base station, an indication of UE capabilities. The UE capabilities may be regarding whether the UE can support wideband physical resource groups (PRGs) in transmission time intervals (TTIs) having durations of one millisecond (1 ms) or more. Alternatively or additionally, the UE capabilities may be regarding whether the UE can support wideband PRGs in short TTIs having durations of less than 1 ms. Alternatively or additionally, the UE capabilities may be regarding whether the UE can support simultaneous wideband PRGs in TTIs having durations of 1 ms or more and wideband PRGs in short TTIs having durations of less than 1 ms. The program code additionally includes program code executable by the computer to receive a configuration, by the UE from the base station, to perform wireless communications in wideband mode for a given TTI.

In another aspect, a non-transitory computer-readable medium having program code recorded thereon, including program code executable by the computer for causing the computer to receive, by a base station from a user equipment (UE), an indication of UE capabilities. The UE capabilities may be regarding whether the UE can support wideband physical resource groups (PRGs) in transmission time intervals (TTIs) having durations of one millisecond (1 ms) or more. Alternatively or additionally, the UE capabilities may be regarding whether the UE can support wideband PRGs in short TTIs having durations of less than 1 ms. Alternatively or additionally, the UE capabilities may be regarding whether the UE can support simultaneous wideband PRGs in TTIs having durations of 1 ms or more and wideband PRGs in short TTIs having durations of less than 1 ms. The program code additionally includes program code executable by the computer for causing the computer to configure the UE, by the base station, to perform wireless communications in wideband mode for a given TTI based at least on the indication of UE capabilities.

In another aspect, an apparatus configured for wireless communication has at least one processor and a memory coupled to the at least one processor. The at least one processor is configured to receive, by a user equipment (UE), downlink control information (DCI) having a resource allocation of allocated physical resource blocks (PRBs). The at least one processor is additionally configured to employ at least one of a) a wideband decoder, b) a wideband channel estimator, c) a bandwidth-specific decoder, or d) a bandwidth-specific channel estimator for wireless communications based at least on a feature of the resource allocation in the DCI.

In another aspect, an apparatus configured for wireless communication has at least one processor and a memory coupled to the at least one processor. The at least one processor is configured to transmit, by a user equipment (UE) to a base station, an indication of UE capabilities. The UE capabilities may be regarding whether the UE can support wideband physical resource groups (PRGs) in transmission time intervals (TTIs) having durations of one millisecond (1 ms) or more. Alternatively or additionally, the UE capabilities may be regarding whether the UE can support wideband PRGs in short TTIs having durations of less than 1 ms. Alternatively or additionally, the UE capabilities may be regarding whether the UE can support simultaneous wideband PRGs in TTIs having durations of 1 ms or more and wideband PRGs in short TTIs having durations of less than 1 ms. The at least one processor is additionally configured to receive a configuration, by the UE from the base station, to perform wireless communications in wideband mode for a given TTI.

In another aspect, an apparatus configured for wireless communication has at least one processor and a memory coupled to the at least one processor. The at least one processor is configured to receive, by a base station from a user equipment (UE), an indication of UE capabilities. The UE capabilities may be regarding whether the UE can support wideband physical resource groups (PRGs) in transmission time intervals (TTIs) having durations of one millisecond (1 ms) or more. Alternatively or additionally, the UE capabilities may be regarding whether the UE can support wideband PRGs in short TTIs having durations of less than 1 ms. Alternatively or additionally, the UE capabilities may be regarding whether the UE can support simultaneous wideband PRGs in TTIs having durations of 1 ms or more and wideband PRGs in short TTIs having durations of less than 1 ms. The at least one processor is additionally configured to configure the UE, by the base station, to perform wireless communications in wideband mode for a given TTI based at least on the indication of UE capabilities.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
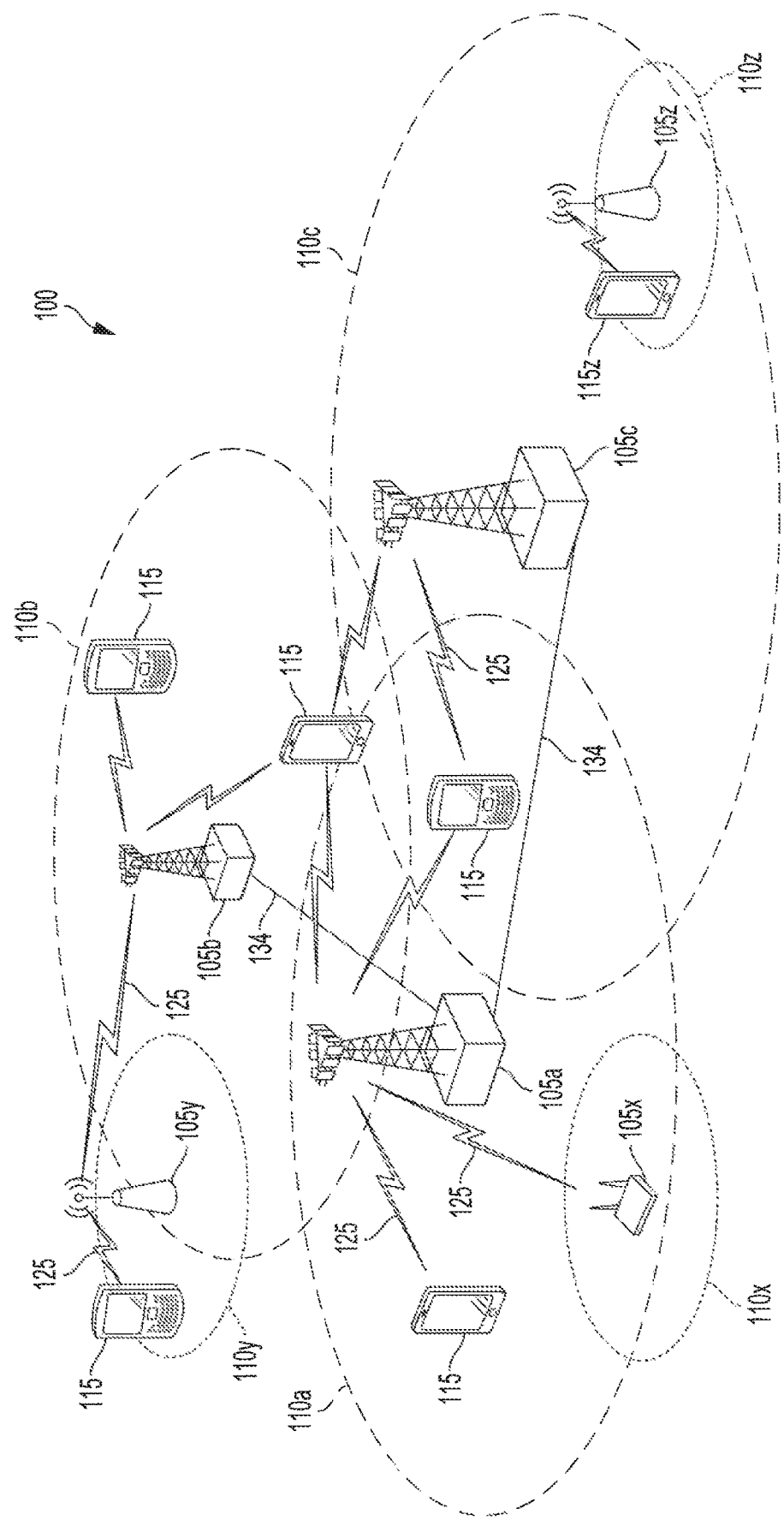
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs. Which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pica cell or a feints; cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a ferrite gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting, examples of a mobile apparatus, such as may comprise embodiments of one or more of UEs 115, include a mobile, a cellular (cell) phone, a smart phone, a session initiation protocol (SIP) phone, a laptop, a personal computer (PC) a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
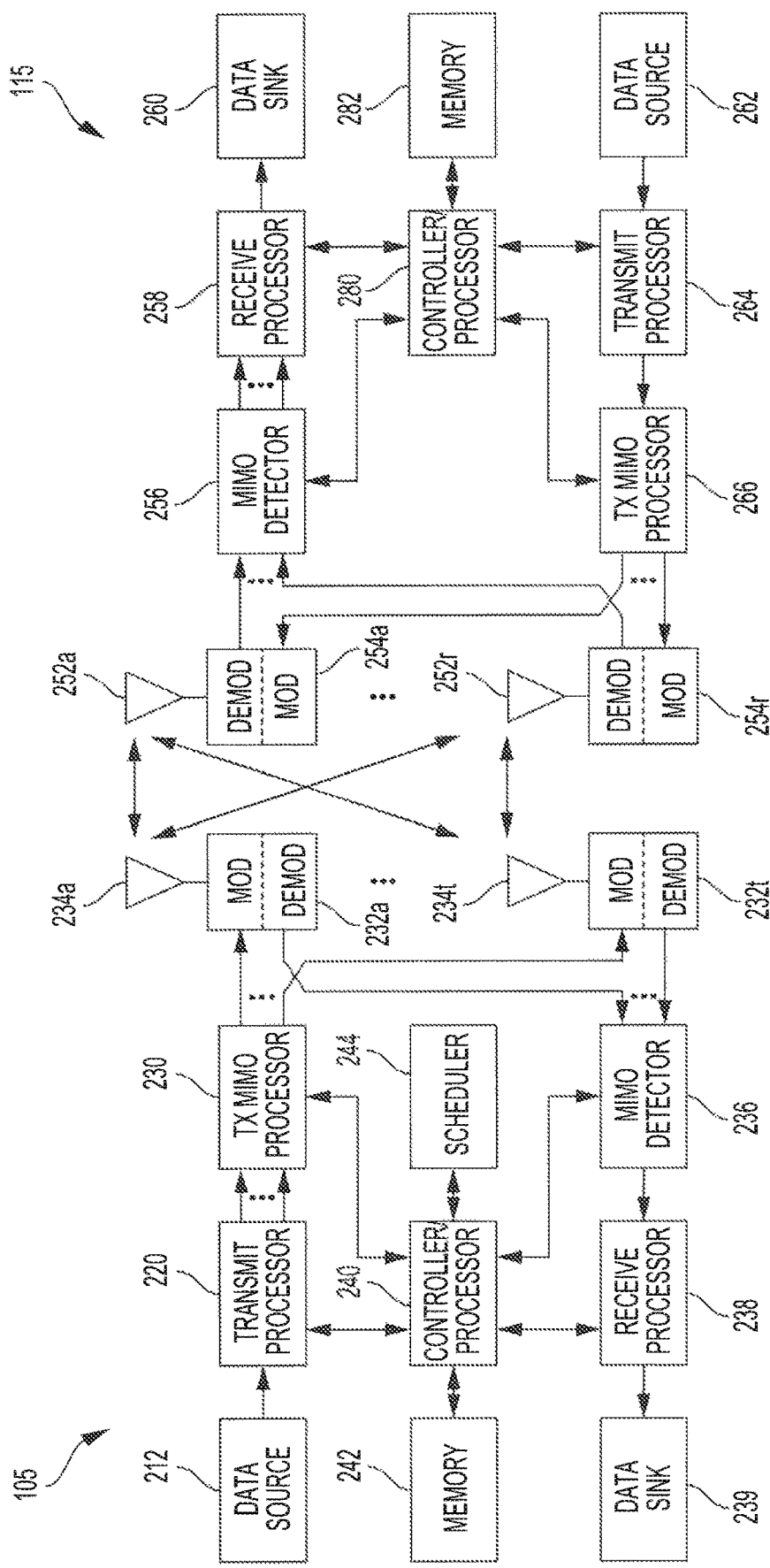
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for orthogonal frequency-division multiplexing (OFDM), etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 3A, 3B, 4A, and 4B, and/or other processes for the techniques described herein. Memories 242 and 282 may store data and program codes for gNB 105 and UE 115, respectively. Scheduler 244 may schedule UEs for data transmission on the downlink and/or uplink.

Recently, interest has arisen regarding indication of wideband physical resource group (PRG) size so that a UE can use an appropriate decoder and/or channel estimator for wireless communications. For example, use of a higher layer parameter (e.g., RRC parameter, etc.) to indicate whether the PRG size corresponds to the whole scheduled bandwidth is currently under consideration. Also under consideration is an optional UE capability to indicate whether the UE can support a PRG size corresponding to the whole scheduled bandwidth.

In new radio (NR), a similar technique is employed with downlink control information (DCI) signalling. One bit in the DCI indicates if the PRG is wideband. Some conditions apply for setting the bit. For example, the allocation has to be a single cluster of length>N consecutive PRBs, with N being fixed in the NR standard specification.

In long term evolution (LTE), there is no DCI bit that indicates whether the PRG bundling corresponds to the whole scheduled bandwidth or less. In some cases (e.g., small allocation, or non-contiguous allocation), the UE cannot perform wideband channel estimation, and there may be performance loss with respect to allowing the eNB to use multiple precoders. The present disclosure presents some rules that allow the UE to implicitly determine, based on a resource allocation in a DCI, whether wideband PRG is used. The present disclosure also provides some mechanisms for a UE to indicate its capabilities to support wideband PRG for different transmission time interval (TTI) durations to a base station. Accordingly, the present disclosure presents advantageous solutions to various problems, such as avoiding performance loss in LTE by helping the eNB avoid the use of multiple precoders, and without increasing overhead by adding an explicit indication in DCI of wideband PRG size. Also, UE indication of its capabilities to support wideband PRG for different TTI durations solves a problem relating to complexity at the UE regarding use of shorter TTI durations and/or wideband PRG. Using a shorter TTI duration is more complex at the UE because all of the operations are performed more quickly. At the same time, supporting wideband PRG, in general, is more complicated than narrowband PRG. Accordingly, a UE may be able to support wideband PRG for 1 ms TTI durations but not for shorter TTI durations. Thus, UE indication of its capabilities to support wideband PRG for different TTI durations also avoids performance loss and waste of resources.

In some aspects, a UE assumes wideband PRG size or falls back to a bandwidth-specific PRG size depending on one or more features of a resource allocation in DCI (e.g., allocated PRBs). That is, the UE selects a PRG size among a plurality of PRG sizes, for example, a wideband PRG and a bandwidth-specific PRG, based on a feature of the resource allocation in the DCI (e.g., whether the resource allocation is contiguous, almost contiguous, non-contiguous, a small resource allocation, and/or the like). For example, it is envisioned that the UE may assume (i.e., select) wideband PRG size if the resource allocation is contiguous and the allocation is more than a predetermined number N PRBs (e.g., N≥10PRBs). The predetermined number may be set in the standards or determined and signaled by the network. Alternatively, the UE may assume (or select) wideband PRG size if the resource allocation is almost contiguous.

It is envisioned that the UE may determine that a resource allocation is almost contiguous if the allocation is for two sets of M1, M2 consecutive PRBs that meet two conditions. The first condition is that the value of each M1 and M2 is larger than N PRBs (e.g., N≥10 PRBs), with M1 not necessarily being equal to M2. The second condition is that there are less than K PRBs between the two sets (e.g., K in the range of 1 to 3 PRBs). This proposal may be extended to more sets, (e.g. {M1/M2/M3/M4 . . . }) with less than K PRBs between them. Alternatively, it is envisioned that the UE may determine that a resource allocation is almost contiguous if the allocation is for a set of M PRBs contained within N consecutive PRBs (e.g., M≥X0 and N−M≤X1, and X0≥10, X1≤3).

In some cases, the resource allocation in DCI and the actual PRBs used tier PDSCH may be different. For example, a physical downlink shared channel (PDSCH) may collide with other signals, such as a primary synchronization signal (PSS), a secondary synchronization signal (SSS), and/or a physical broadcast channel (PBCH). In this case, the eNB can allocate those PRBs and the UE can rate match around the resources corresponding to the collision. In dealing with this situation, there are a couple of alternatives. An advantageous alternative is to determine PRG size based on actual PDSCH mapping, and this alternative is advantageous because since it reflects the PRBs that carry the demodulation reference signals (DMRS), which are used for channel estimation. Another alternative is to determine (or select) PRG size from among a plurality of PRG sizes based on a resource allocation field in a DCI.

It is envisioned that the values for a UE to assume (or select) wideband PRG size (e.g., N, M1, M2, K, number of sets, etc.) can be signaled by an eNB (e.g. in broadcast radio resource control (RRC) signaling and/or unicast RRC signaling) or based on UE capability. Demodulation reference signal (DMRS) density can also change depending on the PRG size. For example, for wideband PRG size, the DMRS density can be smaller due to the presence of smaller edge effect, for example.

The capability and configuration of a UE to support wideband PRG size can further be different for different TTI durations (i.e., lengths). For example, a UE may be able to support wideband PRG in 1 ms TTI but not in a 2 or 3 OFDM symbol (os) short TTI (sTTI). The UE can also signal the capability of supporting simultaneous wideband estimation for multiple channels (e.g., sTTI+1 ms TTI).

Figures 3A, 3B:
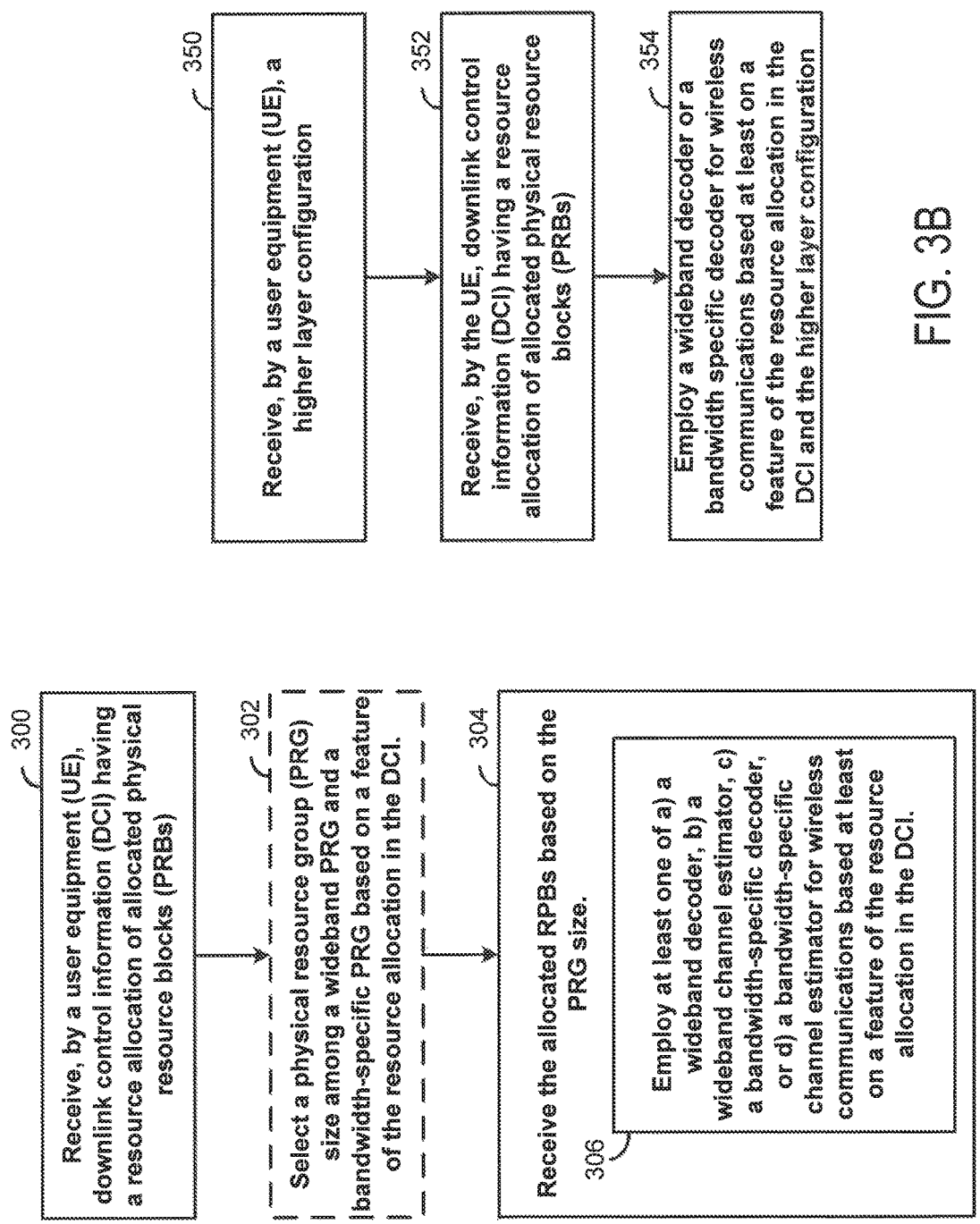
FIG. 3A is a block diagram illustrating example blocks of a wireless communication process carried out by a UE according to some embodiments of the present disclosure.
FIG. 3B is a block diagram illustrating example blocks of a wireless communication process carried out by a UE according to some embodiments of the present disclosure.

Turning now to FIG. 3A, a method of wireless communication begins at block 300. At block 300, the method includes receiving, by a user equipment (UE), downlink control information (DCI) having a resource allocation of allocated physical resource blocks (PRBs). Processing may proceed from block 300 to block 302.

At block 302, the method includes an optional selection of a physical resource group (PRG) size among a wideband PRG and a bandwidth-specific PRG based on a feature of the resource allocation in the DCI. Upon receiving the DCI, the UE may determine the PRG size by examining a feature the resource allocation of the PRBs. Where the feature indicates that the allocated PRBs are contiguous or nearly contiguous, the UE may determine the PRG size as wideband. Otherwise, the UE will fall-back to a bandwidth-specific PRG size.

At block 304, the method includes reception of the allocated PRBs based on the PRG size. Once the PRB size is selected (e.g., a wideband PRG is selected or a bandwidth-specific PRG is selected) based on the feature of the resource allocation received in DCI, the UE can receive the allocated PRBs based on the selected PRG size.

Within the reception of the allocated PRBs at block 304, at block 306, the method includes employing at least one of a) a wideband decoder, b) a wideband channel estimator, c) a bandwidth-specific decoder, or d) a bandwidth-specific channel estimator for wireless communications based at least on a feature of the resource allocation in the DCI. For example, it is envisioned that the feature may correspond to the resource allocation being contiguous and the resource allocation being for more than a predetermined number N of PRBs. As noted above, the predetermined number may be set by standards or determined and signaled by the network. Here, it is envisioned that N may be an integer greater than or equal to ten PRBs (i.e., N≥10), and/or the predetermined number N of PRBs may be based on a UE capability. Alternatively, it is envisioned that the feature may correspond to numbers of PRBs in each of two or more sets of PRBs each exceeding a predetermined number N of PRBs, and one or more numbers of PRBs between each of the two or more sets being less than a predetermined number K of PRBs. Here, it is envisioned that N may be an integer greater than or equal to ten PRBs (i.e., N≥10), and K may reside within a range of one to three PRBs (i.e., 1≤K≤3). Additionally, it is envisioned that at least one value of at least one of N or K may be based on a UE capability. Alternatively, it is envisioned that the feature may correspond to the resource allocation being for a set of an integer M PRBs contained within a predetermined number N of consecutive PRBs. Here, it is envisioned that the integer M may be greater than or equal to ten PRBs (i.e., M≥10), and a difference between N and M lies in a range less than or equal to three PRBs (e.g., N−M≤3). Additionally, it is envisioned that at least one value of at least one of N, M, or N−M may be based on a UE capability.

Referring now to FIG. 3B, a method of wireless communication includes blocks 352 and 354, which respectively include one or more of the functionalities for blocks 300, 302, 304, and 306 (see FIG. 3A), as detailed above. In addition, the method includes block 350. At block 350, the method includes receiving, by the user equipment (UE), a higher layer configuration. For example, the UE may receive a higher layer configuration that includes values for N, M, K, N-M, numbers of sets, etc. In such cases, it is envisioned that the UE may, at block 354, employ at least one of a) a wideband decoder, b) a wideband channel estimator, c) a bandwidth-specific decoder, or d) a bandwidth-specific channel estimator for wireless communications based at least on a feature of the resource allocation in the DCI, for which the values for N, M, K, N-M, numbers of sets, etc. are based on the higher layer configuration by the base station, based on UE capabilities, or combinations thereof. Alternatively or additionally, block 350 may include receiving a higher layer configuration indicative of use of wideband PRG. In such cases, it is envisioned that the UE may, at block 354, employ at least one of a) a wideband decoder, b) a wideband channel estimator, c) a bandwidth-specific decoder, or d) a bandwidth-specific channel estimator for wireless communications further based at least on the higher layer configuration. For example, the UE may, at block 350, receive multiple higher layer configurations indicative of use of wideband PRG for different TTI lengths. In such cases, it is envisioned that the UE may, at block 354, employ at least one of a) a wideband decoder, b) a wideband channel estimator, c) a bandwidth-specific decoder, or d) a bandwidth-specific channel estimator for wireless communications further based at least on a TTI length associated to the DCI received at block 352.

Figures 4A, 4B:
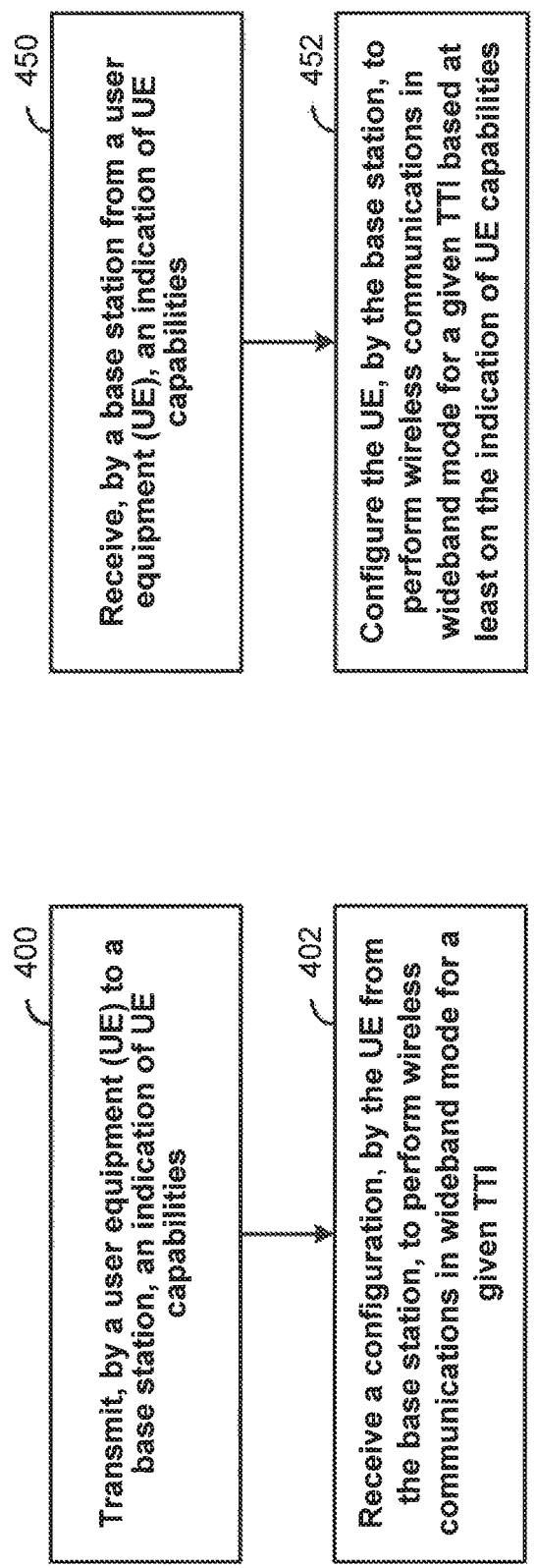
FIG. 4A is a block diagram illustrating example blocks of a wireless communication process carried out by a UE according to some embodiments of the present disclosure.
FIG. 4B is a block diagram illustrating example blocks of a wireless communication process carried out by a base station according to some embodiments of the present disclosure.

Turning now to FIG. 4A, a method of wireless communication begins at block 400. At block 400, the method includes transmitting, by a user equipment (UE) to a base station, an indication of UE capabilities. For example, the indication may correspond to an indication whether the UE can support wideband physical resource groups (PRGs) in transmission time intervals (TTIs) having durations of one millisecond (1 ms) or more. Alternatively or additionally, the indication may correspond to an indication whether the UE can support wideband PRGs in short TTIs having durations of less than 1 ms. Alternatively or additionally, the indication may correspond to an indication whether the UE can support simultaneous wideband PRGs in TTIs having durations of 1 ms or more and wideband PRGs in short TTIs having durations of less than 1 ms. For example, the indication may correspond to an indication that the TTI can support wideband PRGs in TTIs having durations of 1 ms or more and wideband PRGs in short TTIs having durations of less than 1 ms, but not both simultaneously. Processing may proceed from block 400 to block 402.

At block 402, the method includes receiving a configuration, by the UE from the base station, to perform wireless communications in wideband mode for a given TTI. For example, the base station may configure the UE to perform wireless communications in wideband mode for a TTI having a duration of 1 ms or more, but not for a short TTI having a duration of less than 1 ms. Alternatively, the base station may configure the UE to perform wireless communications in wideband mode for a TTI having a duration of 1 ms or more and for a short TTI having a duration of less than 1 ms, but not both simultaneously. Accordingly, the UE performs wireless communication in wideband mode according to the configuration.

Referring now to FIG. 4B, a method of wireless communication begins at block 450. At block 450, the method includes receiving, by a base station from a user equipment (UE), an indication of UE capabilities. For example, the indication may correspond to an indication whether the UE can support wideband physical resource groups (PRGs) in transmission time intervals (TTIs) having durations of one millisecond (1 ms) or more. Alternatively or additionally, the indication may correspond to an indication whether the UE can support wideband PRGs in short TTIs having durations of less than 1 ms. Alternatively or additionally, the indication may correspond to an indication whether the UE can support simultaneous wideband PRGs in TTIs having durations of 1 ms or more and wideband PRGs in short TTIs having durations of less than 1 ms. For example, the indication may correspond to an indication that the UE can support wideband PRGs in TTIs having durations of 1 ms or more and wideband PRGs in short TTIs having durations of less than 1 ms, but not both simultaneously. Processing may proceed from block 450 to block 452.

At block 452, the method includes configuring the UE, by the base station, to perform wireless communications in wideband mode for a given TTI based at least on the indication of UE capabilities. For example, the base station may configure the UE to perform wireless communications in wideband mode for a TTI having a duration of 1 ms or more, but not for a short TTI having a duration of less than 1 ms. Alternatively, the base station may configure the UE to perform wireless communications in wideband mode for a TTI having a duration of 1 ms or more and for a short TTI having a duration of less than 1 ms, but not both simultaneously.

Figure 5:
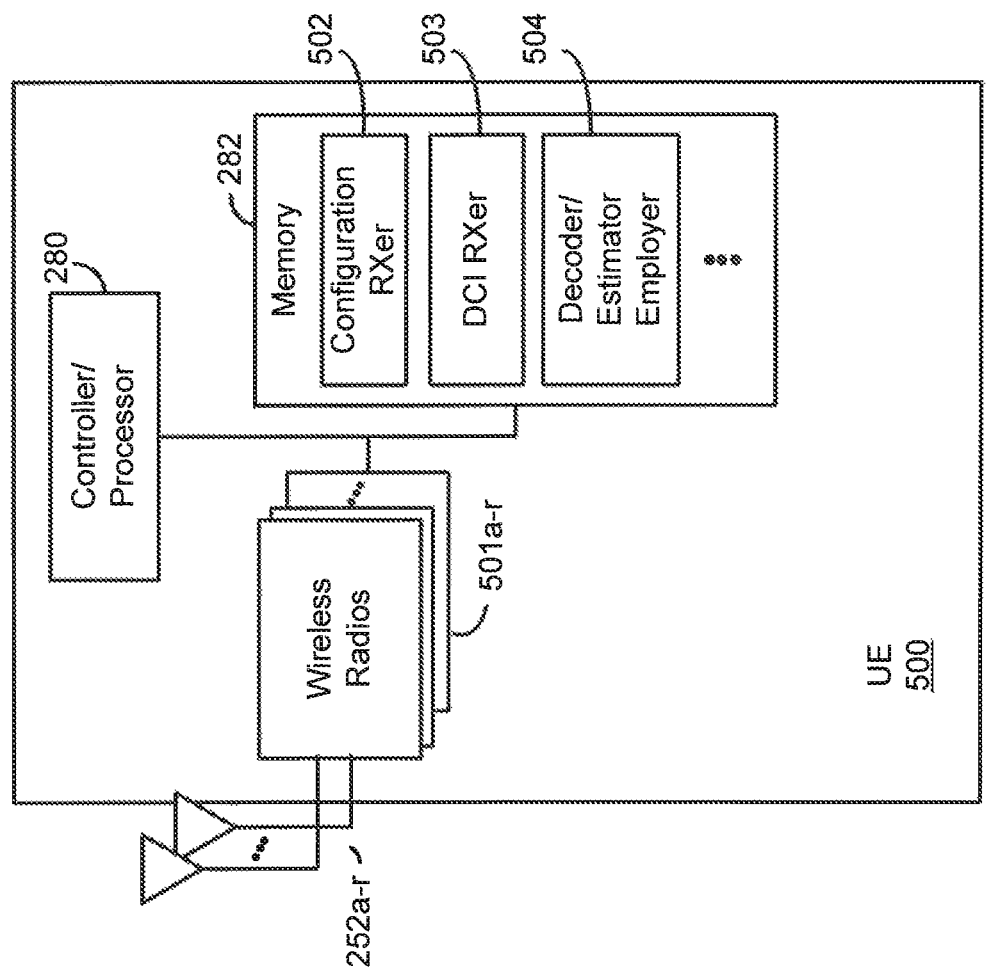
FIG. 5 is a block diagram conceptually illustrating a design of a UE configured to carry out wireless communications according to some embodiments of the present disclosure.

Turning now to FIG. 5, a UE 500, such as a UE 115 (see FIG. 2), may have a controller/processor 280, a memory 282, and antennas 252a through 252r, as described above. UE 500 may also have wireless radios 501a to 501r that comprise additional components also described above with reference to FIG. 2. The memory 282 of UE 500 stores algorithms that configure processor/controller 280 to carry out procedures as described above with reference to FIGS. 3A and 3B.

Algorithms stored by memory 282 configure processor/controller 280 to carry out procedures relating to wireless communication by the UE 500, as previously described. For example, configuration receiver 502 configures controller processor 280 to carry out operations that include receiving, by the user equipment (UE) 500, a higher layer configuration in any manner previously described, such as in block 350 (see FIG. 3B). Additionally, DCI receiver 503 configures controller processor 280 to carry out operations that include receiving, by the user equipment (UE) 500, downlink control information (DCI) having a resource allocation of allocated physical resource blocks (PRBs) in any manner previously described, such as in blocks 300 (see FIG. 3A) and/or 352 (see FIG. 3B). Also, decoder/estimator employer 504 configures controller processor 280 to carry out operations that include employing at least one of a) a wideband decoder, b) a wideband channel estimator, c) a bandwidth-specific decoder, or d) a bandwidth-specific channel estimator for wireless communications based at least on a feature of the resource allocation in the DCI in any manner previously described, such as in blocks 306 (see FIG. 3A) and/or 354 (see FIG. 3B). It is also understood that wideband or band-specific decoders or channel estimators may additionally or alternatively be implemented in radio 501a-r or receive processor 258 with reference to FIG. 2.

Figure 6:
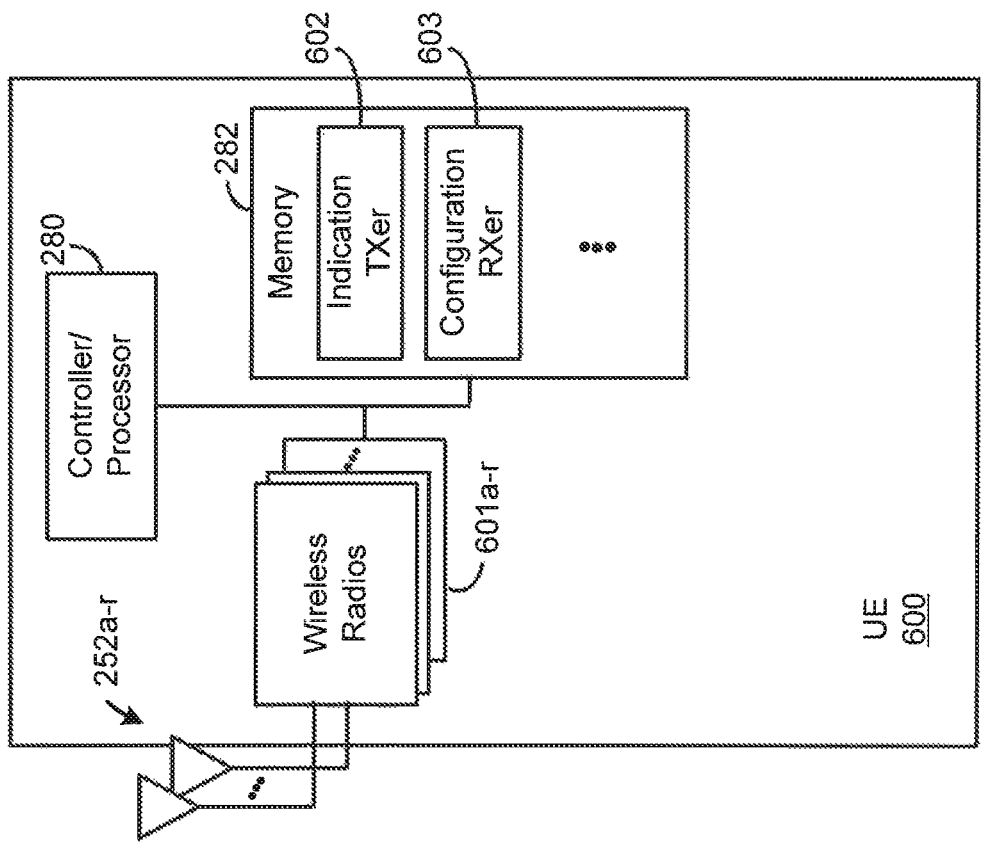
FIG. 6 is a block diagram conceptually illustrating a design of a UE configured to carry out wireless communications according to some embodiments of the present disclosure.

Turning now to FIG. 6, a UE 600, such as a UE 115 (see FIG. 2), may have a controller/processor 280, a memory 282, and antennas 252a through 252r, as described above, UE 600 may also have wireless radios 601a to 601r that comprise additional components also described above with reference to FIG. 2. The memory 282 of UE 600 stores algorithms that configure processor/controller 280 to carry out procedures as described above with reference to FIG. 4A.

Algorithms stored by memory 282 configure processor/controller 280 to carry out procedures relating to wireless communication by the UE 600, as previously described. For example, indication transmitter 602 configures controller processor 280 to carry out operations that include transmitting, by a user equipment (UE) 600 to a base station, an indication of UE capabilities in any manner previously described, such as in block 400 (see FIG. 4A). Additionally, configuration receiver 603 configures controller processor 280 to carry out operations that include receiving a configuration, by the UE 600 from the base station, to perform wireless communications in wideband mode for a given TTI in any manner previously described, such as in blocks 402 (see FIG. 4A). It is also understood that indication transmitter 602 can additionally or alternatively be implemented in processor 264 where processor 264 and/or 280 may then instruct transmission of an indication of the UE capabilities as discussed above. Furthermore, configuration receiver 603 can additionally or alternatively be implemented in receive processor 258.

Figure 7:
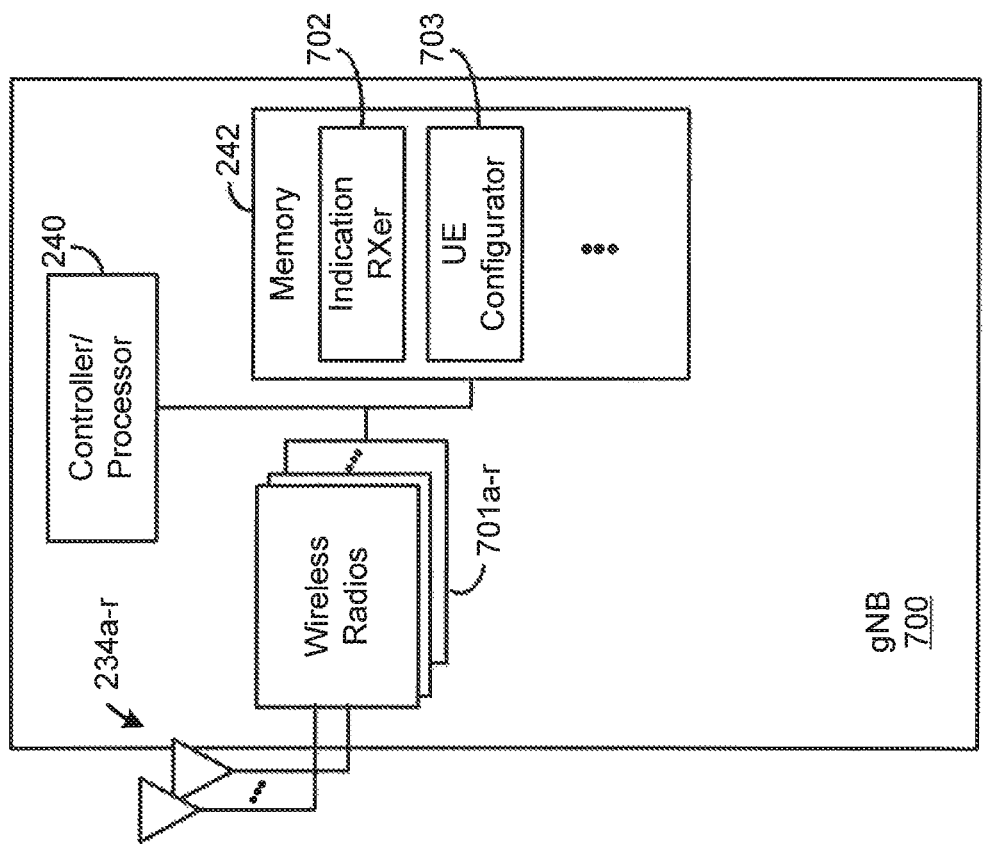
FIG. 7 is a block diagram conceptually illustrating a design of a base station configured to carry out wireless communications according to some embodiments of the present disclosure.

Turning now to FIG. 7, a base station 700, such as a NR-SS base station 105 (see FIG. 2), may have a controller/processor 240, a memory 242, and antennas 234a through 234t, as described above. The base station 700 may also have wireless radios 701a to 701t that comprise additional components also described above with reference to FIG. 2. The memory 242 of base station 700 stores algorithms that configure processor/controller 240 to carry out procedures as described above with reference to FIG. 4B.

Algorithms stored by memory 242 configure processor/controller 240 to carry out operations relating to wireless communication by the base station 700, as previously described. For example, indication receiver 702 configures controller processor 240 to carry out operations that include receiving, by the base station 700 from a user equipment (UE), an indication of UE capabilities in any manner previously described, such as in block 450 (see FIG. 4B). Additionally, UE configurator 703 configures controller processor 240 to carry out operations that include configuring the UE, by the base station 700, to perform wireless communications in wideband mode for a given TTI based at least on the indication of UE capabilities in any manner previously described, such as in block 452 (see FIG. 4B).). It is understood that indication receiver 702 can additionally or alternatively be implemented in receive processor 238. Furthermore, UE configurator 703 can additionally or alternatively be implemented in transmit processor 230, where transmit processor 230 and/or processor 240 may be configured to transmit, or instruct the transmission of, a configuration instructing or enabling the UE to perform wireless communications in wideband mode for a given TTI based at least on the indication of UE capabilities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2-7) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in random access memory (RAM) memory, flash memory, read-only memory (ROM) memory, erasable programmable read-only memory (EPROM) memory, electrically erasable programmable read-only memory (EEPROM) memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. ALSO, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
   receiving, by a user equipment (UE), downlink control information (DCI) having a resource allocation of allocated physical resource blocks (PRBs), the resource allocation of the allocation PRBs being either contiguous or non-contiguous; and
   receiving, by the UE, the allocated PRBs based on a physical resource group (PRG) size, the PRG size selected between a wideband PRG size and a bandwidth-specific PRG size based on whether the resource allocation of the allocation of PRBs indicated in the DCI is contiguous or non-contiguous.

2. The method of claim 1, wherein the receiving the allocated PRBs based on the PRG size comprises:
   employing at least one of a) a wideband decoder, or b) a wideband channel estimator, when the feature of the resource allocation is contiguous, or at least one of c) a bandwidth-specific decoder, or d) a bandwidth-specific channel estimator when the feature of the resource allocation is non-contiguous.

3. The method of claim 2, wherein the feature comprises the resource allocation being for more than a predetermined number N of PRBs.

4. The method of claim 2, wherein N≥10.

5. The method of claim 2, wherein the predetermined number N of PRBs is based on at least one of a UE capability or a higher layer configuration by a base station.

6. The method of claim 2, wherein the feature comprises:
   numbers of PRBs in each of two or more sets of PRBs each exceeding a predetermined number N of PRBs; and
   one or more numbers of PRBs between each of the two or more sets is less than a predetermined number K of PRBs.

7. The method of claim 6, wherein N≥10 and 1≤K≤3.

8. The method of claim 6, wherein at least one value of at least one of N or K is based on at least one of a UE capability or a higher layer configuration by a base station.

9. The method of claim 2, further comprising:
   receiving a higher layer configuration indicative of use of wideband PRG, wherein the employing at least one of a) the wideband decoder, b) the wideband channel estimator, c) the bandwidth-specific decoder, or d) the bandwidth-specific channel estimator for wireless communications is further based at least on the higher layer configuration.

10. The method of claim 9, further comprising:
    receiving multiple higher layer configurations indicative of use of wideband PRG for different TTI lengths, wherein the employing at least one of a) the wideband decoder, b) the wideband channel estimator, c) the bandwidth-specific decoder, or d) the bandwidth-specific channel estimator for wireless communications is further based at least on a TTI length associated to the DCI.

11. The method of claim 1, wherein the feature comprises:
    the resource allocation being for a set of an integer M PRBs contained within a predetermined number N of consecutive PRBs.

12. The method of claim 11, wherein M≥10 and N−M≤3.

13. The method of claim 11, wherein at least one value of at least one of N, M, or N−M is based on at least one of a UE capability or a higher layer configuration by a base station.

14. An apparatus configured for wireless communication, the apparatus comprising:
    at least one processor; and
    a memory coupled to the at least one processor, wherein the at least one processor is configured:
    to receive, by a user equipment (UE), downlink control information (DCI) having a resource allocation of allocated physical resource blocks (PRBs), the resource allocation of the allocation PRBs being either contiguous or non-contiguous; and
    to receive, by the UE, the allocated PRBs based on a physical resource group (PRG) size, the PRG size selected between a wideband PRG size and a bandwidth-specific PRG size based on whether the resource allocation of the allocation of PRBs indicated in the DCI is contiguous or non-contiguous.

15. The apparatus of claim 14, wherein the configuration of the at least one processor to receive the allocated PRBs based on the PRG size comprises configuration of the at least one processor:
    to employ at least one of a) a wideband decoder, or b) a wideband channel estimator, when the feature of the resource allocation is contiguous, or at least one of c) a bandwidth-specific decoder, or d) a bandwidth-specific channel estimator when the feature of the resource allocation is non-contiguous.

16. The apparatus of claim 15, wherein the feature comprises the resource allocation being for more than a predetermined number N of PRBs.

17. The apparatus of claim 15, wherein N≥10.

18. The apparatus of claim 15, wherein the predetermined number N of PRBs is based on at least one of a UE capability or a higher layer configuration by a base station.

19. The apparatus of claim 15, wherein the feature comprises:
  numbers of PRBs in each of two or more sets of PRBs each exceeding a predetermined number N of PRBs; and
  one or more numbers of PRBs between each of the two or more sets is less than a predetermined number K of PRBs.

20. The apparatus of claim 19, wherein N≥10 and 1≤K≤3.

21. The apparatus of claim 19, wherein at least one value of at least one of N or K is based on at least one of a UE capability or a higher layer configuration by a base station.

22. The apparatus of claim 15, further comprising configuration of the at least one processor:
  to receive a higher layer configuration indicative of use of wideband PRG, wherein the employing at least one of a) the wideband decoder, b) the wideband channel estimator, c) the bandwidth-specific decoder, or d) the bandwidth-specific channel estimator for wireless communications is further based at least on the higher layer configuration.

23. The apparatus of claim 22, further comprising configuration of the at least one processor:
  to receive multiple higher layer configurations indicative of use of wideband PRG for different TTI lengths, wherein the employing at least one of a) the wideband decoder, b) the wideband channel estimator, c) the bandwidth-specific decoder, or d) the bandwidth-specific channel estimator for wireless communications is further based at least on a TTI length associated to the DCI.

24. The apparatus of claim 14, wherein the feature comprises:
  the resource allocation being for a set of an integer M PRBs contained within a predetermined number N of consecutive PRBs.

25. The apparatus of claim 24, wherein M≥10 and N−M≤3.

26. The apparatus of claim 24, wherein at least one value of at least one of N, M, or N−M is based on at least one of a UE capability or a higher layer configuration by a base station.

27. A non-transitory computer-readable medium having program code recorded thereon, which when executed causes a processor to perform wireless communication operations, the program code comprising code for:
  receiving, by the processor, downlink control information (DCI) having a resource allocation of allocated physical resource blocks (PRBs), the resource allocation of the allocation PRBs being either contiguous or non-contiguous; and
  receiving, by the processor, the allocated PRBs based on a physical resource group (PRG) size, the PRG size selected between a wideband PRG size and a bandwidth-specific PRG size based on whether the resource allocation of the allocation of PRBs indicated in the DCI is contiguous or non-contiguous.

28. The non-transitory computer-readable medium of claim 27, wherein the code for receiving the allocated PRBs based on the PRG size further comprises code for:
  employing at least one of a) a wideband decoder, or b) a wideband channel estimator, when the feature of the resource allocation is contiguous, or at least one of c) a bandwidth-specific decoder, or d) a bandwidth-specific channel estimator when the feature of the resource allocation is non-contiguous.

29. The non-transitory computer-readable medium of claim 28, wherein the feature comprises the resource allocation being for more than a predetermined number N of PRBs.

30. The non-transitory computer-readable medium of claim 27, wherein the feature comprises the resource allocation being for a set of an integer M PRBs contained within a predetermined number N of consecutive PRBs.

* * * * *

UNITED STATES PATENT AND TRADEMARK OFFICE
CERTIFICATE OF CORRECTION

| | |
|---|---|
| PATENT NO. | : 11,206,661 B2 |
| APPLICATION NO. | : 16/671053 |
| DATED | : December 21, 2021 |
| INVENTOR(S) | : Rico Alvarino et al. |

It is certified that error appears in the above-identified patent and that said Letters Patent is hereby corrected as shown below:

In the Claims

In Claim 1, Column 17, Line number 49, replace "the allocation PRBs" with --the allocated PRBs--. Also, in Claim 1, Column 17, Line number 55, replace "the allocation of PRBs" with --the allocated PRBs--.

In Claim 14, Column 18, Line number 50, replace "the allocation PRBs" with --the allocated PRBs--. Also, in Claim 14, Column 18, Line number 56, replace "the allocation of PRBs" with --the allocated PRBs--.

In Claim 27, Column 20, Line number 16, replace "the allocation PRBs" with --the allocated PRBs--. Also, in Claim 27, Column 20, Line number 22, replace "the allocation of PRBs" with --the allocated PRBs--.

Signed and Sealed this
Fourth Day of October, 2022

Katherine Kelly Vidal
*Director of the United States Patent and Trademark Office*